(12) United States Patent
Long

(10) Patent No.: US 11,451,032 B2
(45) Date of Patent: Sep. 20, 2022

(54) WATER RESISTANT BOX FOR POWER OUTLET

(71) Applicant: Chengli Li, Suzhou (CN)

(72) Inventor: Bocheng Long, Suzhou (CN)

(73) Assignee: Chengli Li, Suzhou (CN)

(*) Notice: Subject to any disclaimer, the term of this patent is extended or adjusted under 35 U.S.C. 154(b) by 58 days.

(21) Appl. No.: 16/950,497

(22) Filed: Nov. 17, 2020

(65) Prior Publication Data

US 2022/0131354 A1    Apr. 28, 2022

(30) Foreign Application Priority Data

Oct. 23, 2020    (CN) .......................... 202022386207.0

(51) Int. Cl.
*H02G 3/08*     (2006.01)
*H02G 3/14*     (2006.01)

(52) U.S. Cl.
CPC ............. *H02G 3/088* (2013.01); *H02G 3/083* (2013.01)

(58) Field of Classification Search
CPC .......... H02G 3/08; H02G 3/081; H02G 3/083; H02G 3/088; H02G 3/14; H05K 5/0247; H05K 5/069; H05K 5/06; H05K 5/0217
See application file for complete search history.

(56) References Cited

U.S. PATENT DOCUMENTS

| | | | | |
|---|---|---|---|---|
| 4,436,952 A * | 3/1984 | Lockwood | ............. | H02G 3/083 174/661 |
| 4,484,021 A * | 11/1984 | Schaefer | ................ | H02G 3/088 174/67 |
| 4,724,282 A * | 2/1988 | Troder | ................... | H02G 3/083 174/661 |
| 6,365,831 B1 * | 4/2002 | Rupp | ..................... | H02G 3/083 439/535 |
| 2020/0244056 A1 * | 7/2020 | Ustianowski | .......... | H02G 3/088 |

* cited by examiner

*Primary Examiner* — Hoa C Nguyen
*Assistant Examiner* — Amol H Patel
(74) *Attorney, Agent, or Firm* — Chen Yoshimura LLP

(57) ABSTRACT

A water resistant box includes a front cover, a base for accommodating a power outlet receptacle, and a cable passage cover. The base is coupled to the front cover. The cable passage cover is pivotally coupled to the base, configured to pivot to an open position when the water resistant box is in use and pivot to a closed position when the water resistant box is not in use. The water resistant box can protect power outlets against water when used ins outdoor or wet conditions. It also makes the box easier to use and solves the problem of parts being misplaced.

19 Claims, 8 Drawing Sheets

WATER RESISTANT BOX FOR POWER OUTLET

BACKGROUND OF THE INVENTION

Field of the Invention

This invention relates to water protection for electrical appliances, and in particular, it relates to a water resistant box for power outlet.

Description of Related Art

Power outlets are used to supply power to electrical appliances. When used in kitchens, bathrooms, outdoors or other potentially wet conditions, power outlets may come in contact with water, which may cause current leakage, electric shock or other dangers. In some conventional water resistant boxes for power outlets, the base of the box typically has a cable passage cover formed as one piece with the base; the user needs to remove the cable passage cover before using the box. This is inconvenient, and the cable passage cover cannot be re-attached once it is removed. In some other conventional water resistant boxes, the cable passage cover can be disassembled and re-assembled; the user disassembles the cable passage cover before using the box, and re-assembles it after using the box. The cable passage cover often get lost in such use scenarios.

SUMMARY

Embodiments of the present invention provides a water resistant box that is more convenient to use and more versatile.

In one aspect, the present invention provides a water resistant box, which includes:
a front cover;
a base, coupled to the front cover, configured to accommodate a power outlet receptacle within it; and
a cable passage cover, pivotally coupled to the base, configured to pivot to an open position when the water resistant box is in use and pivot to a closed position when the water resistant box is not in use.

In some embodiments, the base includes:
a rotating shaft slot;
at least one pair of installation clamps, which are disposed facing each other to define the rotating shaft slot between them; and
at least two snap retaining edges, located at a top of the base.

In some embodiments, the cable passage cover includes:
a rotating shaft, disposed within the rotating shaft slot;
at least one installation hole, disposed adjacent to the rotating shaft, configured to cooperate with the pair of installation clamps to allow the rotating shaft to rotate with the rotating shaft slot; and
at least two snap features, respectively corresponding to the at least two snap retaining edges, configured to cooperate with the at least two snap retaining edges to maintain the cable passage cover in the closed position with respect to the base.

In some embodiments, the cable passage cover further includes a sealing groove and the base further includes a sealing rib, configured to engage each other to form a seal when the cable passage cover is in the closed position with respect to the base.

In some embodiments, the base further includes an adapter plate, disposed in the base, configured to form an opening which is adapted to accommodate one or more predefined power outlet receptacle.

In some embodiments, the adapter plate includes:
a primary opening, configured to accommodate a first type of power outlet receptacle; and
at least one set of auxiliary openings, configured to define a secondary opening in the adapter plate which is adapted to accommodate a second type of power outlet receptacle, wherein the second type of power outlet receptacle is different from the first type of power outlet receptacle, and the secondary opening is different from the primary opening.

In some embodiments, the adapter plate defines a plurality of sets of auxiliary openings, and wherein each auxiliary opening has an end portion with a predefined shape that extends in a radially outward direction.

In some embodiments, the shape of the end portion is a triangle, arc, or a polygon, or a combination thereof.

In some embodiments, the auxiliary openings are spatially arranged to form the secondary opening that is a round shape or a rectangular shape.

In some embodiments, the adapter plate includes a plurality of sets of auxiliary openings, which are spatially arranged to define a plurality of secondary openings having the same or different shapes or sizes. When the plurality of secondary openings have different sizes and the same shapes, the plurality of sets of auxiliary openings are spaced apart and nested on the adapter plate.

Compared to conventional technologies, the water resistant box according to embodiments of the present invention employs a pivoting structure to connect the cable passage cover to the base, so that the cable passage cover can be pivoted to open to allow the box to be used, and pivoted to close after use. This solves the problem of inconvenience and misplacement of parts.

BRIEF DESCRIPTION OF THE DRAWINGS

Preferred embodiments of the present invention are described with reference to the drawings. These drawings serve to explain the embodiments and their operating principle, and only illustrate structures that are necessary to the understanding of the principles of the invention. These drawings are not necessarily to scale. In the drawings, like features are designated by like reference symbols.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Embodiments of the present invention provide a water resistant box for power outlets. The water resistant box has a pivotable cable passage cover, which can pivot to an open position when in use (i.e., when a power plug is plugged into the power outlet, to allow the cable of the power plug to exit the box), and pivot to a closed position when not in use (i.e., when no power plug is plugged into the power outlet). This water resistant box solves the problems with conventional water resistant boxes such as inconvenience, lost of parts, etc. Moreover, the water resistant box according to embodiments of the present invention can be adapted for many different types of power outlets, which enhances its versatility and improves user satisfaction.

Figure 1:
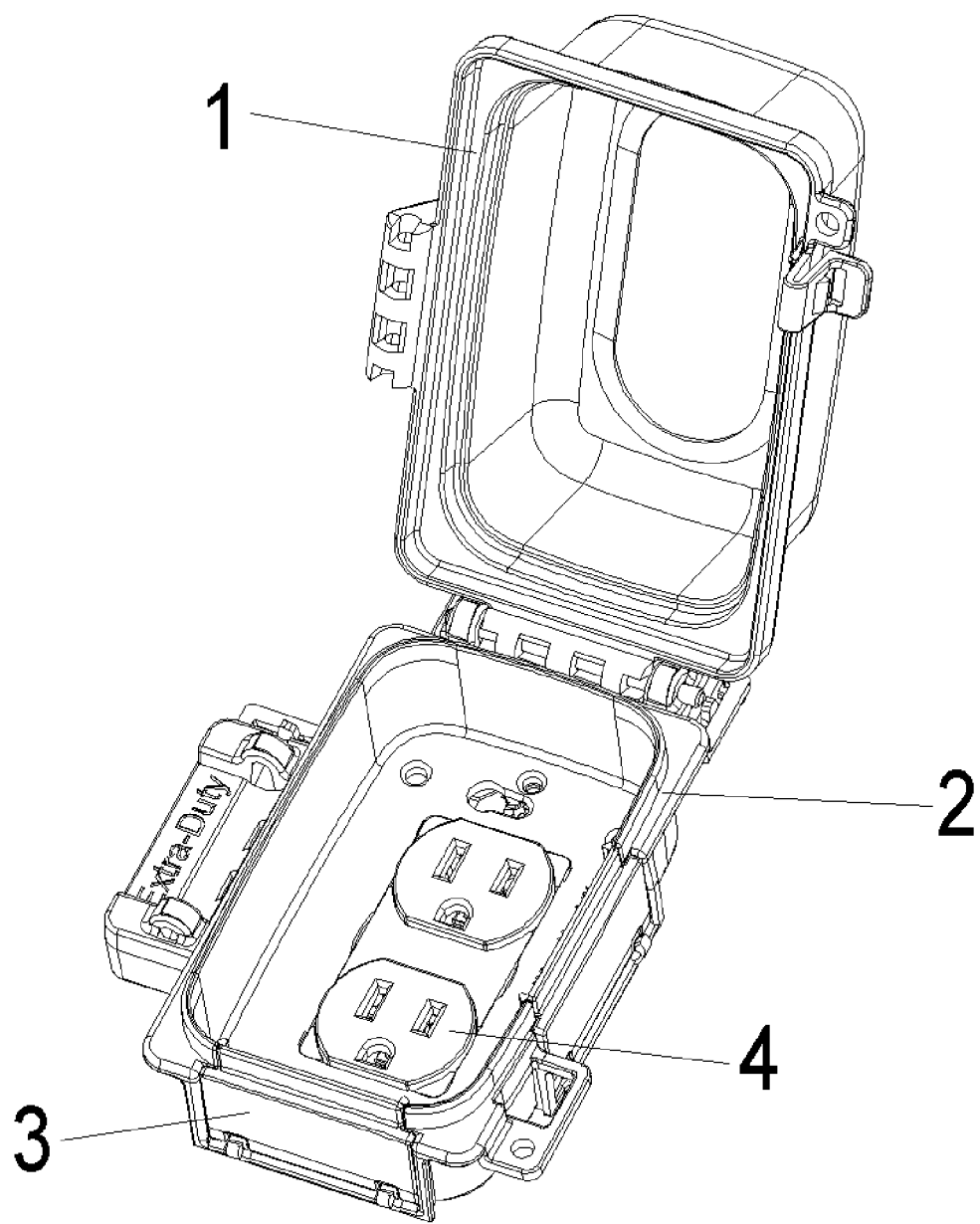
FIG. 1 illustrates a water resistant box for power outlets according to a first embodiment of the present invention, where the cable passage cover is in a closed state.
Figure 2:
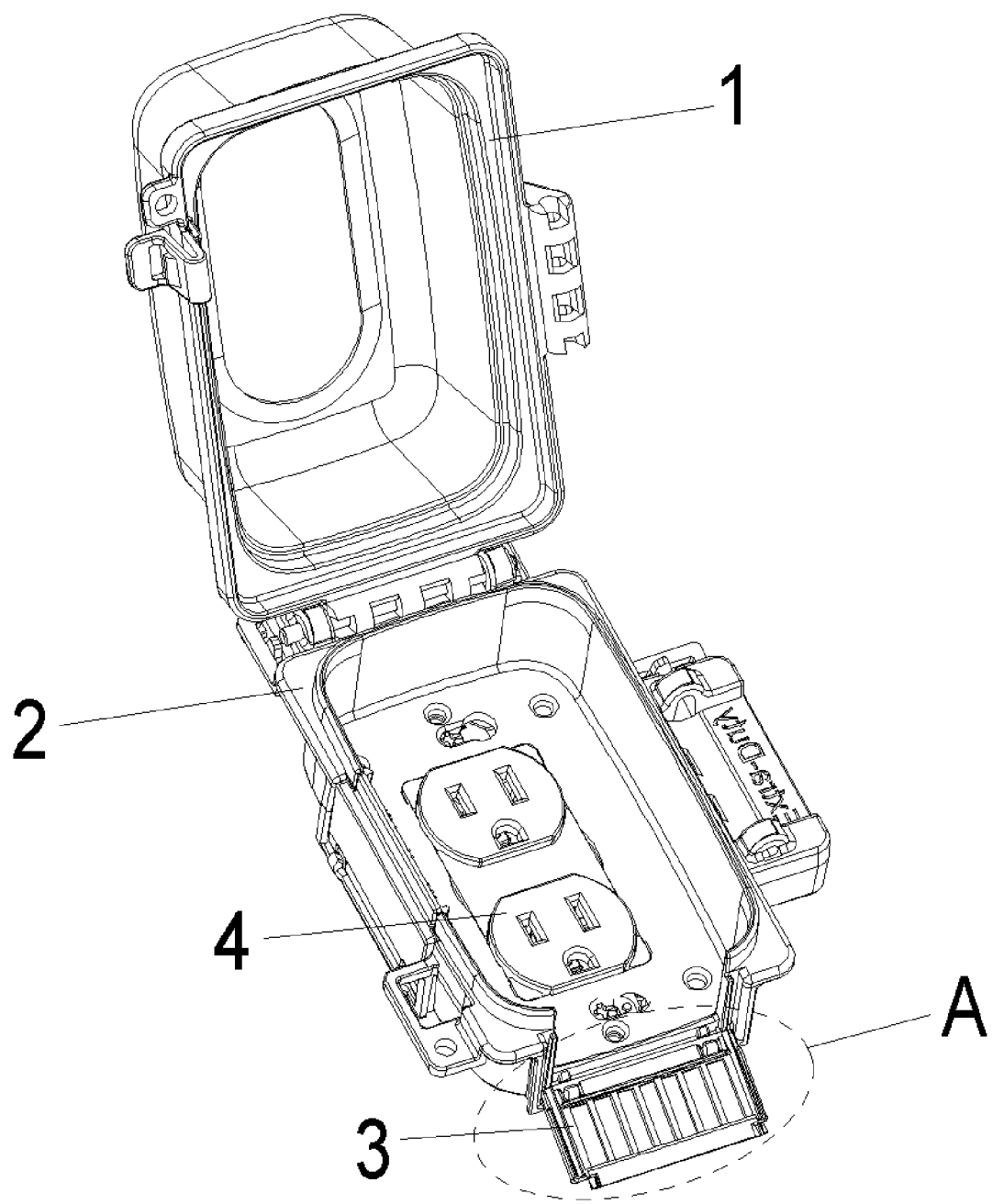
FIG. 2 illustrates the water resistant box for power outlets according to the first embodiment, where the cable passage cover is in an open state.

FIGS. 1 and 2 illustrate a water resistant box according to a first embodiment when the cable passage cover is in the closed and open positions, respectively. As shown in FIGS. 1 and 2, the water resistant box includes a front cover 1, a base 2 configured to accommodate power outlets, and a cable passage cover 3. The front cover 1 is pivotally connected to the base 2 by a hinge, so as to be opened to allow access to the power outlets and closes afterwards to cover the base 2. The cable passage cover 3 is pivotally connected to the base 2, and covers an opening (gate) in one side wall of the base 2. When using the power outlets, the cable passage cover 3 is pivoted to an open position, so as to allow the cable of the power plug to exit the box through the gate. When not in use, the cable passage cover 3 is pivoted to a closed position to close the gate.

Figure 4:
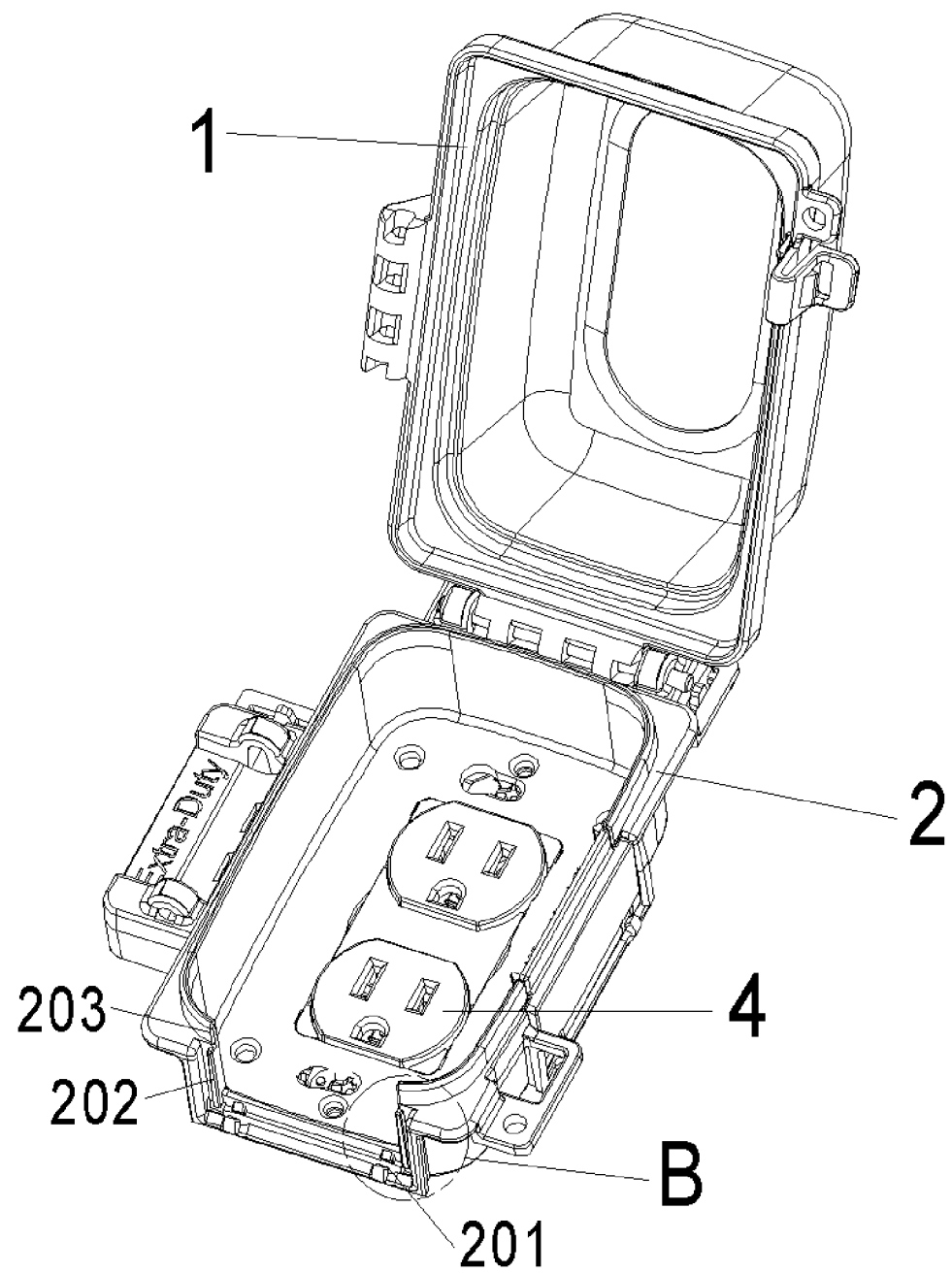
FIG. 4 illustrates a water resistant box for power outlets according to a third embodiment of the present invention.
Figure 5:
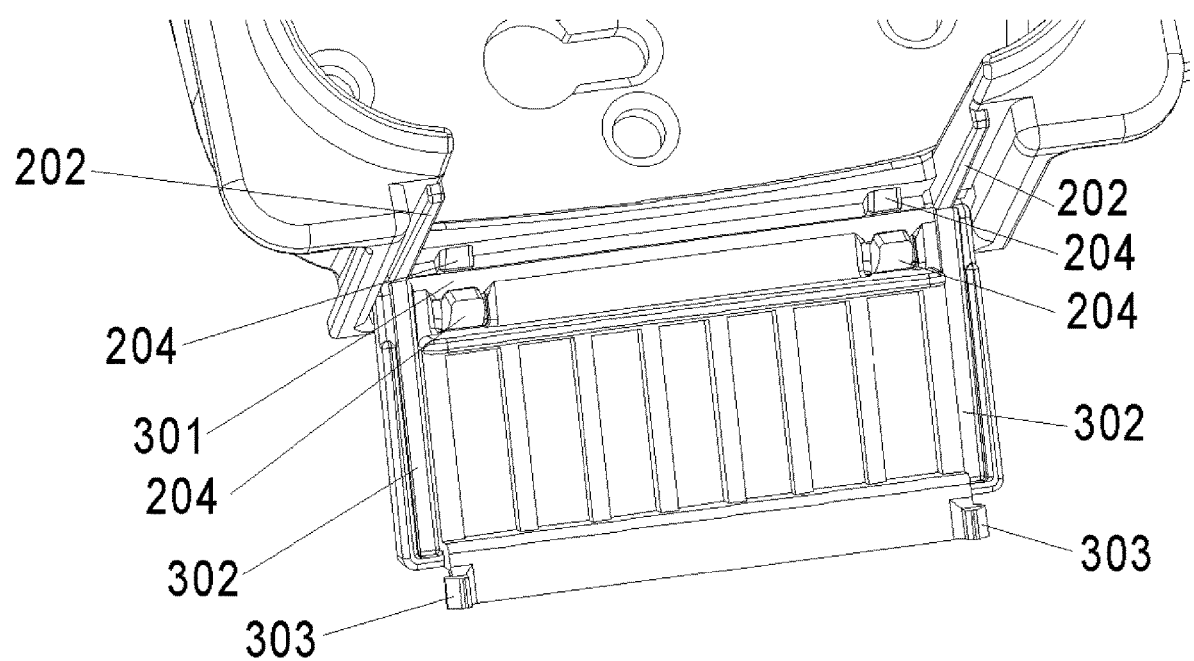
FIG. 5 is a magnified view of a portion of the water resistant box of the first embodiment shown in FIG. 2.
Figure 6:
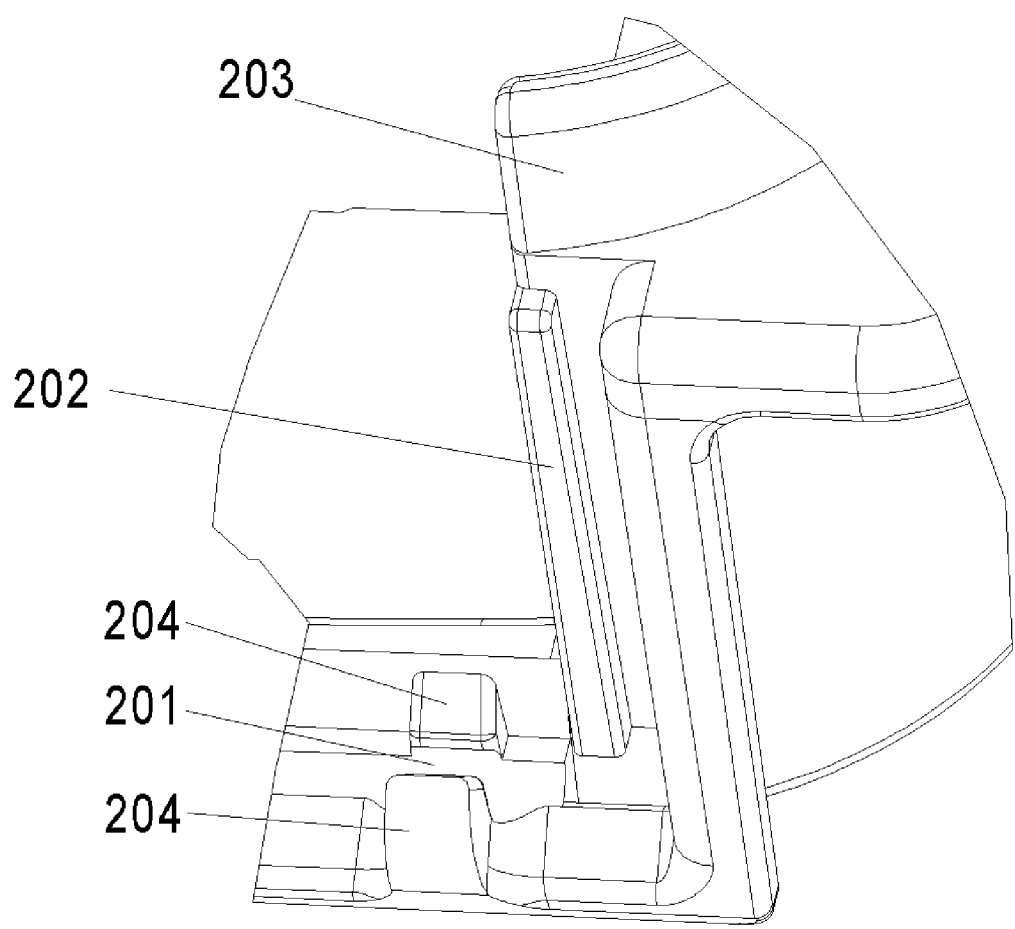
FIG. 6 is a magnified view of a portion of the water resistant box of the third embodiment shown in FIG. 4.

More specifically, as shown in FIG. 6 (which shows a magnified view of the portion B in FIG. 4, on one of the two sides of the base; the other side has a symmetrical structure), the base 2 includes a rotating shaft slot 201, a pair of installation clamps 204 (another pair of installation clamps 204 are shown in FIG. 5), a snap retaining edge 203, and a sealing rib 202. The installation clamps 204 are two protrusions from the base 2, which face each other to define a slot between them; this slot is the rotating shaft slot 201 which serves to accommodate the rotating shaft 301 of the cable passage cover 3. The snap retaining edge 203 is located at the top of the base 2.

Figure 8:
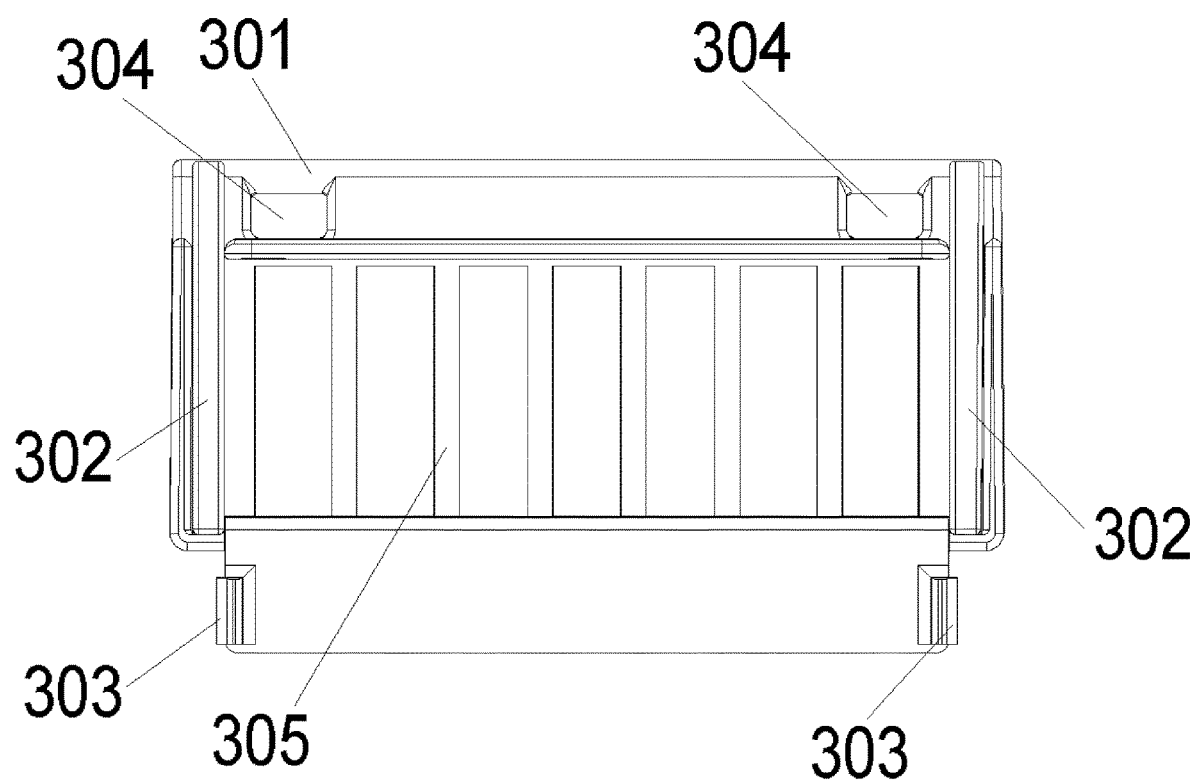
FIG. 8 illustrates the structure of a cable passage cover for a water resistant box according to embodiments of the present invention.

As shown in FIG. 5 (which shows a magnified view of the portion A in FIG. 2) and FIG. 8, the cable passage cover 3 includes a rotating shaft 301, two installation holes 304, two snap features (resilient members) 303, and two sealing grooves 302. The two installation holes 304 are located next to the rotating shaft 301; two installation clamps 204 (one on each side) of the base 2 extend through the two installation holes 304, so that the rotating shaft 301 is locate within the rotating shaft slots 201 and can rotate within the slots. The two snap features 303 respectively cooperate with the corresponding snap retaining edges 203 to keep the cable passage cover 3 in the closed position. More specifically, the snap retaining edges 203 are the top portions of the pair of edges of the gate of the base 2 that is covered by the cable passage cover 3. The snap features 303 are resilient protrusions on the cable passage cover 3 which, when the cable passage cover 3 is rotated to close the gate of the base 2, expand behind the snap retaining edges 203 so that the cable passage cover 3 is securely closed. Thus, when the gate of the base 2 no longer needs to be open, the cable passage cover 3 closes the gate and is maintained in the closed position by means of the cooperation of the snap features 303 and the snap retaining edges 203. Moreover, the sealing grooves 302 and the sealing ribs 202 cooperate with each other (the ribs fall into the grooves) to make the closed gate watertight.

As shown in FIGS. 1 and 2, by the cooperation of the pair of installation holes 304 of the cable passage cover 3 and the corresponding pair of installation clamps 204 of the base 2, the rotating shaft 301 can be retained within the rotating shaft slot 201, to allow the cable passage cover 3 to pivot with respect to the base 2.

Figure 3:
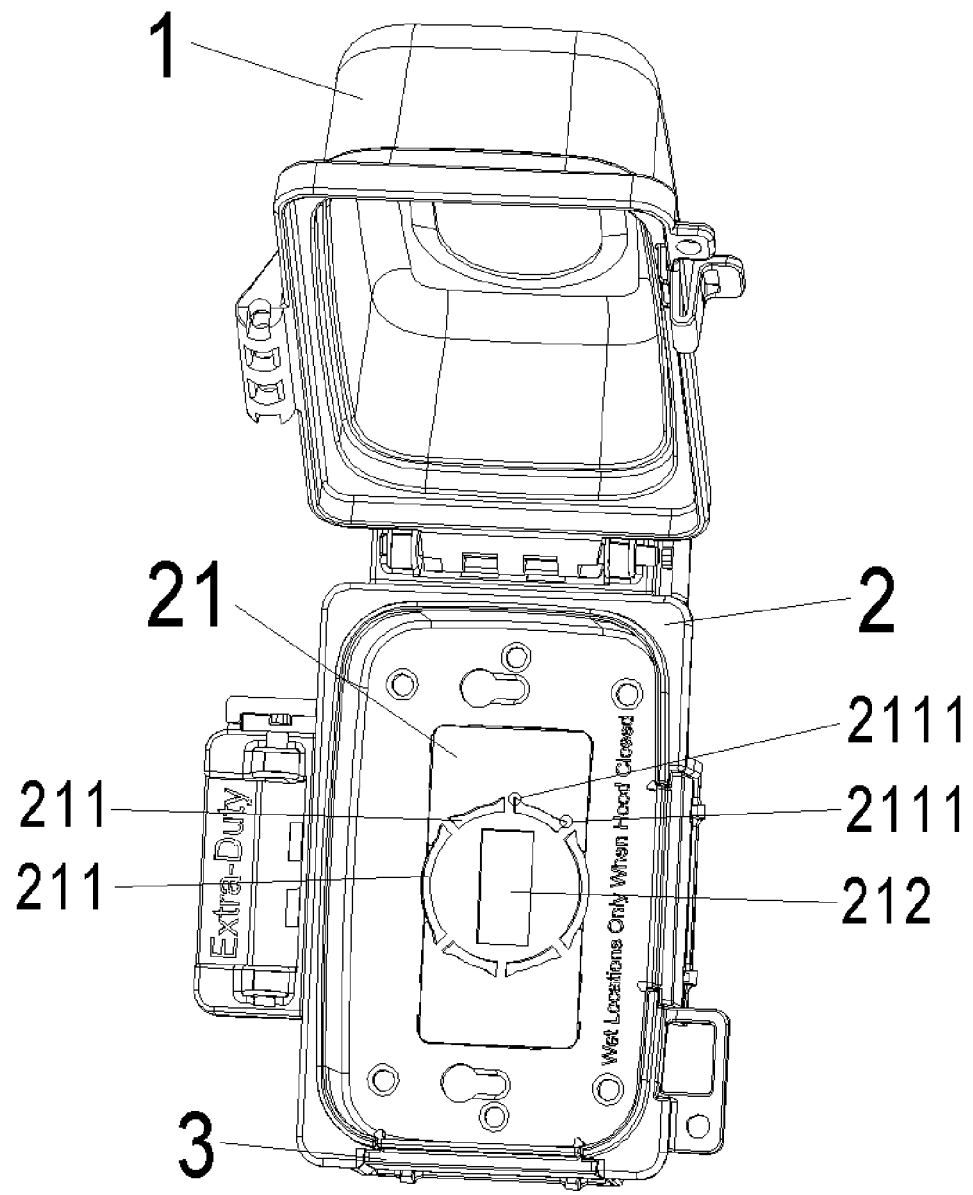
FIG. 3 illustrates a water resistant box according to a second embodiment of the present invention, where the power outlets are not installed.

As shown in FIG. 3, the base 2 further includes an adapter plate 21. The adapter plate 21 is disposed at the bottom of the base 2 over a bottom opening (not shown) in the base 2. For example, the adapter plate 21 may be a rectangular shape that fits in a rectangular opening of the bottom of the base 2. The purpose of the adapter plate 21 is to provide a bottom opening of the base 2 that has a desired size and shape suitable for the power outlet that the water resistant box is intended to be used with. The bottom opening is configured to allow user-operable features of the power outlet to pass into the water resistant box so that they can be accessed by the user. As shown in FIG. 3, the adapter plate 21 defines a primary opening 212 near the center, and multiple auxiliary openings 211. The primary opening 212 is adapted to allow a first type of power outlet receptacles (e.g., Toggle receptacles used in the U.S.) to pass into the box. The auxiliary openings 211 are elongated openings surrounding the primary opening 212, and are intended to be used by the user to cut the adapter plate 21 to form a secondary opening having a different size and shape than the primary opening, to accommodate a second type of power outlet receptacle that is different from the first type. In other words, the auxiliary openings 211 act as perforations for forming the secondary opening, and in the illustrated example, the secondary opening is a round shape defined by the perforations.

Figure 7:
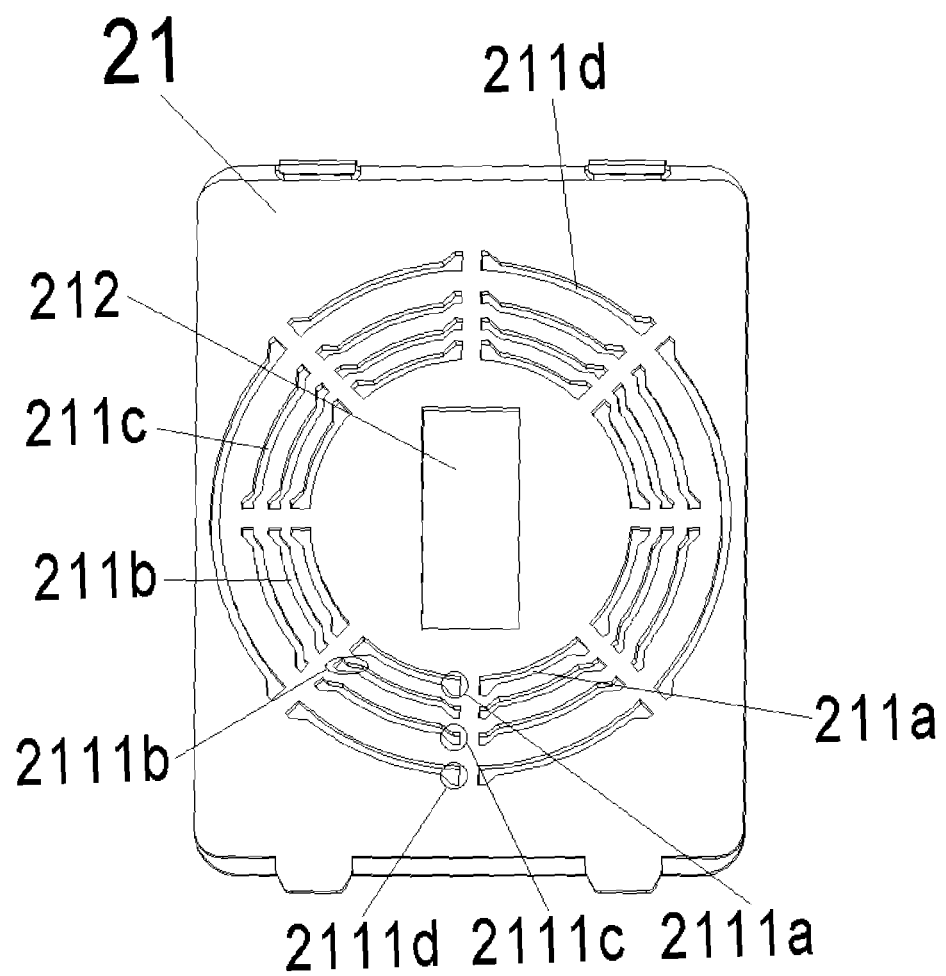
FIG. 7 illustrates the structure of an adapter plate for a water resistant box according to embodiments of the present invention.

As shown in FIGS. 3 and 7, the auxiliary openings 211 may include multiple sets of auxiliary openings, e.g. 211a, 211b, 211c, 211d in the illustrated embodiment. Each set of auxiliary openings is designed to form a secondary opening of a particular size and shape when the adapter plate 21 is cut along that set of auxiliary openings. The sizes, shapes and spatial arrangements of the multiple sets of auxiliary openings are designed based on the sizes and shapes of commonly used power outlet receptacles. Moreover, in preferred embodiments, each end of each auxiliary opening 211 has an end shape 2111 that has a sharp corner or a bend or other shape features. Shape features 2111a, 2111b, 2111c and 2111d for the four sets of auxiliary openings 211a, 211b, 211c and 211d, respectively, are shown in the exemplary embodiment of FIG. 7. The end shape may be a sharp corner with a triangular shape that extends radially outwardly, such as end shape features 2111a and 2111d in FIG. 7, or a slight bend in the radially outward direction (e.g. with a parallelogram shape), such as end shape features 2111b and 2111c in FIG. 7.

In other alternatives, the end shape of each auxiliary openings 211 may be a keyhole with a round or polygonal shape.

As shown in FIGS. 3 and 7, some sets of the auxiliary openings 211 are arranged in nested circles. Further, when the adapter plate 21 includes multiple sets of auxiliary openings 211 that have similar shapes but different sizes, they can be provided simultaneously on the same adapter plate 21, spaced from each other. For example, in FIG. 7, the multiple sets of auxiliary openings 211a-d are arranged in nested circles and spaced from each other, and the primary opening 212 is disposed near the center of the smallest circle 211a. This way, different sized and shaped secondary openings may be formed in the adapter plate 21 by cutting along different sets of auxiliary openings, efficiently utilizing the space of the adapter plate 21.

Further, as shown in FIGS. 1, 2 and 4, the adapter plate 21 may be configured to accommodate two power outlet receptacles simultaneously. Thus, based on the practical need of the user, the adapter plate 21 may be provided with auxiliary openings 211 to accommodate multiple power outlet receptacles, so that the water resistant box may be used for one or more receptacles.

In practice, when the water resistant box is installed in outdoor or wet conditions, based on the types and numbers of power outlet receptacles to be accommodated (e.g., different types of receptacles), the user may directly use the primary opening 212, or use a cutting tool to cut a suitable secondary opening by following one set of the auxiliary openings, to accommodate the desired receptable. Then, the base 2 is fitted over the receptacle and affixed to it.

In embodiments of the present invention, the shaped endings of the auxiliary openings allow the user to more conveniently cut the adapter plate using a cutting tool to form the secondary opening. Moreover, even when the cut edges of the secondary opening is not perfectly even or smooth, the opening can still adequately accommodate the designed type of receptacle. This is because the user may form cuts that connect the pointed corners of the adjacent ends of the auxiliary openings, and such cuts would be located radially outside of the radius of the secondary openings as defined by the edges of the auxiliary openings.

Thus, the water resistant box according to embodiments of the present invention is more conveniently and more flexible for the user and allow them to adapt the box for different types of power outlet receptacles. Compared to conventional technologies, they reduce the difficulties in adaptation (e.g., the cutting of the secondary opening is not required to be perfectly even).

After installing the water resistant box over the power outlet receptacle, the user may open the front cover 1 to plug the power plug into the receptacle, and pivot the cable passage cover 3 to the open position so that the power cord of the power plug can exit the box to connect to the related electrical appliance. After using the electrical appliance, the user may unplug the plug from the receptacle, pivot the cable passage cover 3 to the closed position, so that the cable passage cover 3 seals the base 2 via the sealing ribs 202 and sealing grooves 302, and the cable passage cover 3 is securely connected to the cable passage cover 3 via the snap retaining edge 203 and the snap features 303. This improves the water resistance of the water resistant box.

To summarize, the water resistant box according to embodiments of the present invention can provide strong protection against water when used in outdoor or wet conditions, and solve the problem of parts being misplaced in conventional water resistant boxes; moreover, it allows the user to adapt the box to different types of power outlet receptacles, improving the versatility of the water resistant box.

While the present invention is described above using specific examples, these examples are only illustrative and do not limit the scope of the invention. It will be apparent to those skilled in the art that various modifications, additions and deletions can be made to the water resistant box of the present invention without departing from the spirit or scope of the invention.

What is claimed is:

1. A water resistant box, comprising:
a front cover;
a base, coupled to the front cover, configured to accommodate a power outlet receptacle within it; and
a cable passage cover, pivotally coupled to the base, configured to pivot to an open position when the water resistant box is in use and pivot to a closed position when the water resistant box is not in use,
wherein the base includes a rotating shaft slot, and the cable passage cover includes a rotating shaft disposed within the rotating shaft slot.

2. The water resistant box of claim 1, wherein the base further includes:
at least one pair of installation clamps, disposed facing each other to define the rotating shaft slot between them; and
at least two snap retaining edges, located at a top of the base.

3. The water resistant box of claim 2, wherein the cable passage cover further includes:
at least one installation hole, disposed adjacent to the rotating shaft, configured to cooperate with the pair of installation clamps to allow the rotating shaft to rotate with the rotating shaft slot; and
at least two snap features, respectively corresponding to the at least two snap retaining edges, configured to cooperate with the at least two snap retaining edges to maintain the cable passage cover in the closed position with respect to the base.

4. The water resistant box of claim 1, wherein the cable passage cover further includes a sealing groove, and the base further includes a sealing rib, configured to engage each other to form a seal when the cable passage cover is in the closed position with respect to the base.

5. The water resistant box of claim 1, wherein the base further includes an adapter plate, disposed in the base, configured to form an opening which is adapted to accommodate one or more predefined power outlet receptacle.

6. The water resistant box of claim 5, wherein the adapter plate includes:
a primary opening, configured to accommodate a first type of power outlet receptacle; and
at least one set of auxiliary openings, configured to define a secondary opening in the adapter plate which is adapted to accommodate a second type of power outlet receptacle, wherein the second type of power outlet receptacle is different from the first type of power outlet receptacle, and the secondary opening is different from the primary opening.

7. The water resistant box of claim 6, wherein the adapter plate defines a plurality of sets of auxiliary openings, and wherein each auxiliary opening has an end portion with a predefined shape that extends in a radially outward direction.

8. The water resistant box of claim 7, wherein the shape of the end portion is a triangle, arc, or a polygon, or a combination thereof.

9. The water resistant box of claim 7, wherein the auxiliary openings are spatially arranged to form the secondary opening that is a round shape or a rectangular shape.

10. The water resistant box of claim 6, wherein the adapter plate includes a plurality of sets of auxiliary openings, which are spatially arranged to define a plurality of secondary openings having same or different shapes or sizes, and wherein when the plurality of secondary openings have different sizes and the same shapes, the plurality of sets of auxiliary openings are spaced apart and nested on the adapter plate.

11. A water resistant box, comprising:
a front cover;
a base, coupled to the front cover, configured to accommodate a power outlet receptacle within it; and
a cable passage cover, pivotally coupled to the base, configured to pivot to an open position when the water resistant box is in use and pivot to a closed position when the water resistant box is not in use,
wherein the base includes:
a rotating shaft slot;
at least one pair of installation clamps, disposed facing each other to define the rotating shaft slot between them; and
at least two snap retaining edges, located at a top of the base.

12. The water resistant box of claim 11, wherein the cable passage cover includes:
a rotating shaft, disposed within the rotating shaft slot;
at least one installation hole, disposed adjacent to the rotating shaft, configured to cooperate with the pair of installation clamps to allow the rotating shaft to rotate with the rotating shaft slot; and
at least two snap features, respectively corresponding to the at least two snap retaining edges, configured to cooperate with the at least two snap retaining edges to maintain the cable passage cover in the closed position with respect to the base.

13. The water resistant box of claim 12, wherein the cable passage cover further includes a sealing groove, and the base further includes a sealing rib, configured to engage each other to form a seal when the cable passage cover is in the closed position with respect to the base.

14. The water resistant box of claim 11, wherein the base further includes an adapter plate, disposed in the base, configured to form an opening which is adapted to accommodate one or more predefined power outlet receptacle.

15. The water resistant box of claim 14, wherein the adapter plate includes:
a primary opening, configured to accommodate a first type of power outlet receptacle; and
at least one set of auxiliary openings, configured to define a secondary opening in the adapter plate which is adapted to accommodate a second type of power outlet receptacle, wherein the second type of power outlet receptacle is different from the first type of power outlet receptacle, and the secondary opening is different from the primary opening.

16. The water resistant box of claim 15, wherein the adapter plate defines a plurality of sets of auxiliary openings, and wherein each auxiliary opening has an end portion with a predefined shape that extends in a radially outward direction.

17. The water resistant box of claim 16, wherein the shape of the end portion is a triangle, arc, or a polygon, or a combination thereof.

18. The water resistant box of claim 16, wherein the auxiliary openings are spatially arranged to form the secondary opening that is a round shape or a rectangular shape.

19. The water resistant box of claim 15, wherein the adapter plate includes a plurality of sets of auxiliary openings, which are spatially arranged to define a plurality of secondary openings having same or different shapes or sizes, and wherein when the plurality of secondary openings have different sizes and the same shapes, the plurality of sets of auxiliary openings are spaced apart and nested on the adapter plate.

* * * * *